---

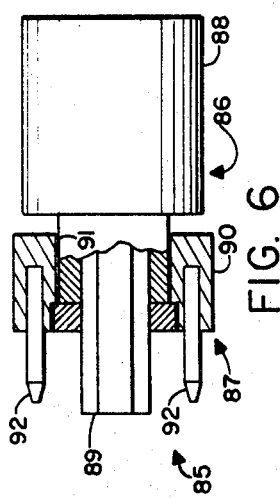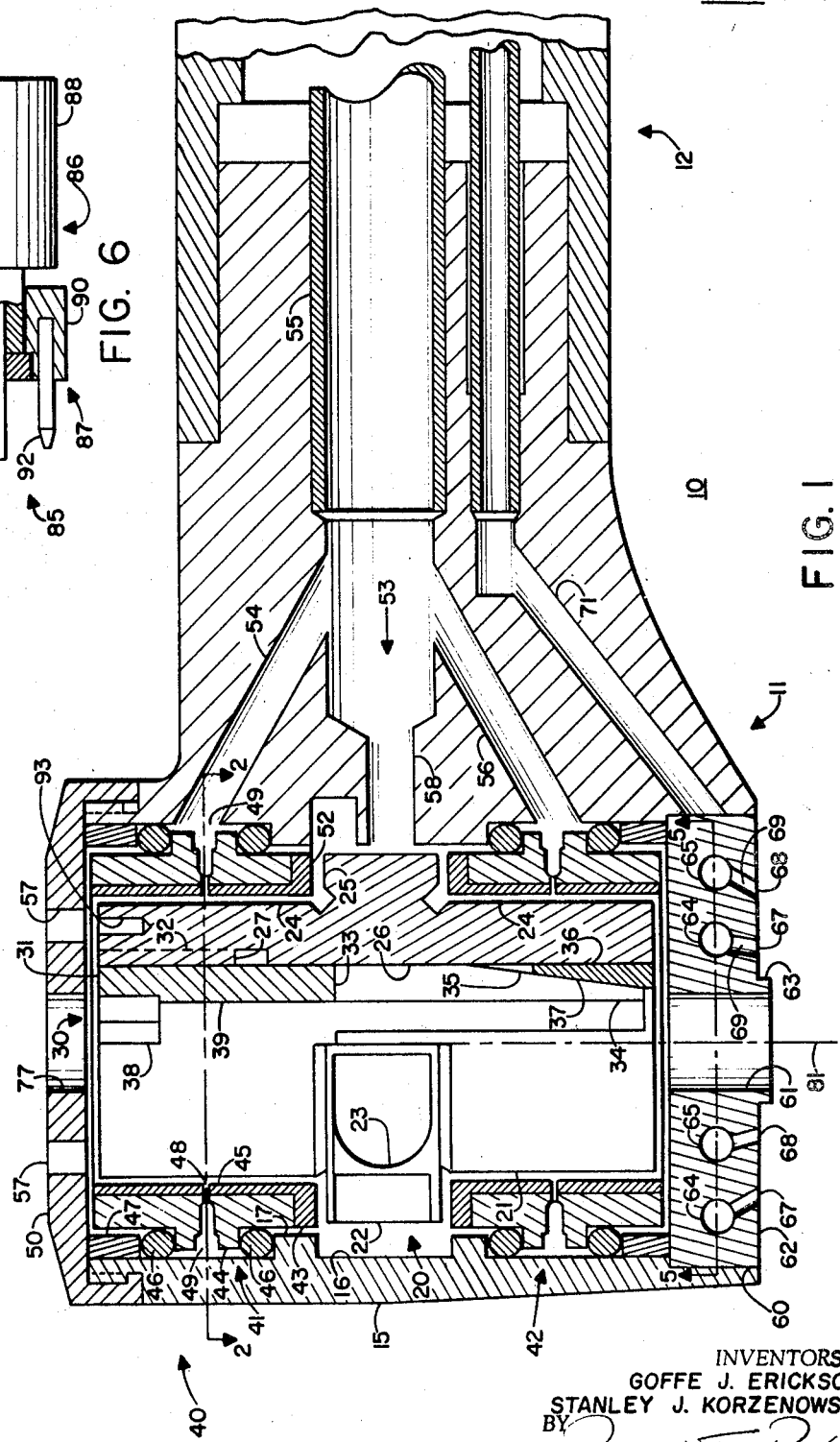

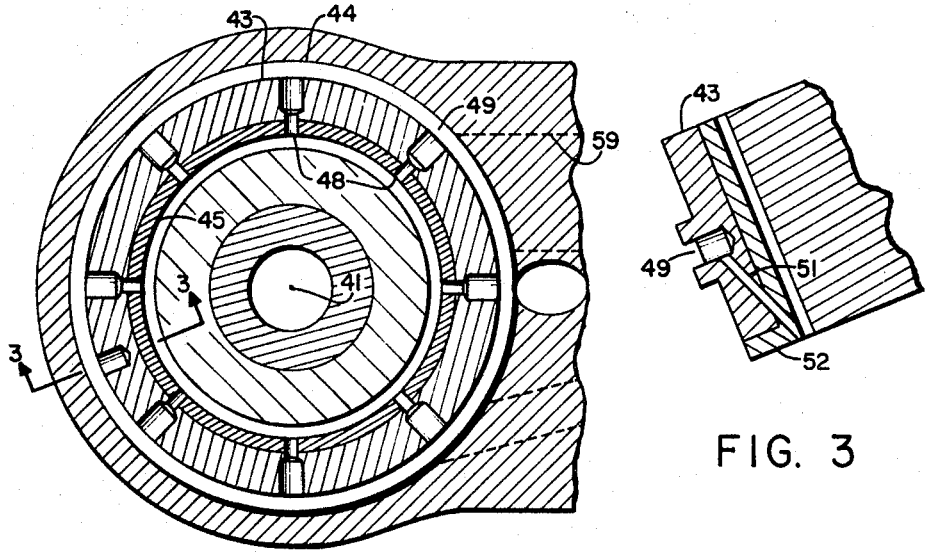
FIG. 2
FIG. 3
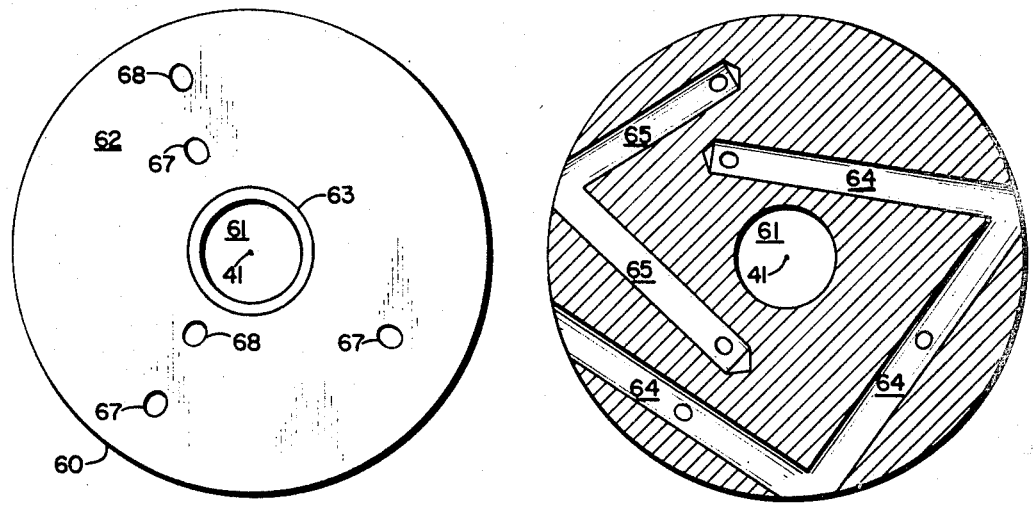
FIG. 4
FIG. 5
INVENTORS.
GOFFE J. ERICKSON
STANLEY J. KORZENOWSKI
BY Ronald T. Reiling
ATTORNEY

United States Patent Office 3,451,134
Patented June 24, 1969

3,451,134
DENTAL HANDPIECE
Goffe J. Erickson and Stanley J. Korzenowski, Minneapolis, Minn., assignors to Honeywell Inc., Minneapolis, Minn., a corporation of Delaware
Filed Sept. 12, 1966, Ser. No. 578,710
Int. Cl. A61c *1/08*; F01d *15/06*
U.S. Cl. 32—28                                                6 Claims

---

ABSTRACT OF THE DISCLOSURE

This application discloses a fluid driven, gas bearing dental handpiece capable of extremely high speed operation. A cooling manifold in the handpiece provides fluid to the dental tool. Bearing contamination is eliminated by having a projection on the manifold. Both liquid and gas are utilized in the cooling operation.

---

This invention pertains to an improved dental handpiece. The applicants' unique dental handpiece utilizes a fluid driven rotor rotatably supported within the head by combined hydrodynamic and hydrostatic bearing means. The handpiece is designed to provide much greater concentricity than prior art handpieces. The applicants' handpiece now allows dentists to install any size dental tool and retain high speeds and excellent concentricity thereby allowing operation with more precision than was heretofore possible. The applicants' have also provided a unique cooling manifold which greatly increases the cooling effectiveness, performance, and reliability of the handpiece.

The scope of the invention will become apparent from a study of the accompanying specification in conjunction with the drawing in which: FIGURE 1 is the partial cross-sectional view of the applicants' dental handpiece; FIGURE 2 is a cross-sectional view taken along line 2—2 of FIGURE 1; FIGURE 3 is a cross-sectional view taken along line 3—3 of FIGURE 2; FIGURE 4 is a plan view of the cooling manifold; FIGURE 5 is a cross-sectional view of the cooling manifold taken along line 5—5 of FIGURE 1; and FIGURE 6 is a partial cross-sectional view of the wrench means.

Referring now to FIGURE 1, reference numeral 10 generally depicts the applicants' dental handpiece including a head element 11 and handle means 12.

Head 11 comprises a housing means 15 having a generally cylindrical bore 16 therethrough. Rotor means 20 includes a generally cylindrical shaft 21 having an enlarged radius section 22 centrally positioned thereon. Thus a cylindrical surface 24 is provided on either side of enlarged radius section 22. Enlarged radius section 22 has an annular planar surface 25 on either side thereof and a plurality of turbine buckets 23 machined on the periphery thereof. The rotor means 20 has a cylindrical, central bore 26 therethrough. One end of bore 26 is threaded as at 27.

Collet means 30 are positioned within rotor means 20. Collet means 30 comprises a cylindrical collet burr 31 having threads 32 on one end thereof threadably engaged with threads 27 of rotor means 20. The other end of collet burr 31 has a plurality of longitudinal slots 33 therein so as to form a plurality of jaws 34. Jaws 34 are tapered radially inwardly and as at 35. Collet means 30 includes a collet seat 36 which is rigidly attached at one end of bore 24 to shaft 21 of rotor means 20. Collet seat 36 also tapers radially inward as at 37; the taper corresponds with the taper 35 of collet burr 31. Collet burr 31 also contains a hexagonal socket 38 therein adapted to receive the end of a suitable wrench (not shown). Rotation of collet burr 31 relative to shaft 21 of rotor means 20 causes the collet burr to be longitudinally displaced relative thereto. Collet burr 31 contains a central aperture 39 therein adapted to receive a dental tool. Longitudinal movement of collet burr 31 relative to shaft 21 or rotor means 20 causes jaws 34 to hold or release the dental tool in an obvious manner. Of course various other types of collets may be utilized.

Bearing means 40 are provided to support rotor means 20 for rotation about an axis 81 relative to housing means 15. Bearing means 40 comprises an upper bearing 41 and a lower bearing 42 positioned on either side of enlarged radius section 22 of rotor means 20. Upper bearing means 41 and lower bearing means 42 are identical and only upper bearing means 41 will be described in detail. Upper bearing means 41 includes a generally cylindrical bearing pad 43 having an enlarged radius portion 44 centrally located thereon. Bearing pad 43 has a central aperture therethrough defining a radial supporting surface 45. Bearing pad 43 is positioned within bore 16 of housing means 15 with radial support surface 45 concentric and spaced apart from cylindrical surface 24. The end of bearing pad 43 contiguous enlarged radius section 22 has an annular planar surface thereon defining an axial supporting surface 52. An "O" ring 46 is positioned between housing means 15 and bearing pad 43 on either side of enlarged radius section 44. The lower "O" ring as viewed in FIGURE 1 abuts against a shoulder 17 of housing means 15 and a bushing 47 is positioned above the upper O ring. Bearing pad 43, O rings 46 and bushing 47 are held in position by an end cap 50 threadably engaged to housing means 15. Bearing pad 43 is thus resiliently mounted on housing means 15 by O rings 46 which allow limited rotational and translational movement thereof relative to the housing means. More specifically, bearing pad 43 has limited freedom along an axis 81 and about an axis perpendicular to the plane of the drawing (FIGURE 1). This allows the bearing pad to "follow" the rotor means when it is subjected to side loading and precludes surface contact therebetween. Bearing pad 43 also has a plurality of radial passages 48 therethrough as best illustrated in FIGURE 2. Passages 48 are equally, angularly spaced about axis 81. End cap 50 has two openings 57 and a central opening 77 therethrough.

Passage means 53 are provided in head element 11 to supply fluid to said bearing means 40. Passage means 53 includes an annular chamber 49 formed between housing means 15, bearing pad 43 and O rings 46. Chamber 49 is completely sealed by O rings 46 and functions as a fluid manifold. Passage means 53 also includes a main supply passage 55. Ancillary passages 54 and 56 are in fluid communication with supply passage 55 and direct fluid to upper and lower bearing means 41, 42. That is, passage 54 supplies fluid to annular chamber 49. The fluid flowing from chamber 49 through passages 48 coacts with cylindrical surface 24 of rotor means 20 and radial supporting surface 45 of bearing pad 43 to provide radial support for rotor means 20. A passage 51 is provided in bearing pad 43 from chamber 49 to the opening between annular planar surface 25 of enlarged radius section 22 of rotor means 20 and axial supporting surface 52 of bearing pad 43 (see FIGURE 3). The fluid flowing from chamber 49 through passage 51 coacts with annular surface and axial supporting surface 52 to provide axial support for rotor means 20. Passage 51 allows a higher pressure fluid to be supplied between surfaces 25 and 52 than if exhaust fluid from passages 48 was utilized. Accordingly, stiffer axial support is provided.

A cooling manifold 60 is provided and is attached to housing means 15 at one end of bore 16 by means of a press fit. Manifold 60 has a central opening 61 therethrough. Cooling manifold 60 has a generally planar exterior surface 62 having an annular projection or shoulder 63 surrounding opening 61. As illustrated in FIGURE 5, cooling manifold 60 has a liquid passage 64 and a gas passage 65 therein. Surface 62 has three orifices 67 therein in fluid communication with liquid passage 64. Surface 62 has two orifices 68 therein in fluid communication with gas passage 65. Best illustrated in FIGURE 1 orifices 67, 68 are connected with their respective passages through conduits 69 inclined with respect to axis 81 so as to direct liquid and gas to the dental tool positioned in collet means 30. Liquid is supplied to passage 64 by means of a conduit 71 and gas (air) is supplied to passage 64 by means of a conduit identical to conduit 71 but not visible in FIGURE 1. The air and liquid conduits are adapted to be connected to suitable sources at the base of handle 12.

A nozzle 58 is provided in head 17 to direct fluid from supply passage 55 to turbine buckets 23 on rotor means 20. An exhaust passage 59 is also provided in head 17.

Wrench means 85 is illustrated in FIGURE 6 and includes a torquing element 86 and mounting means 87. Torquing element 86 comprises a handle 88 having a hexagonal shaft 89 rigidly attached thereto. Mounting means 87 comprises an annular collar 90 having an opening 91 therethrough and a pair of elongated pins 92 rigidly attached to the collar. Torquing element 86 extends through opening 91 and is mounted upon mounting means 87 for rotation relative to collar 90.

In operation, a dental tool is positioned within aperture 39 of collet means 30. Wrench means 85 is positioned adjacent to end cap 50 with pins 92 extending through openings 57 and projecting into bores 93 in rotor means 20. This prevents rotation of rotor means 20 relative to housing means 15. Shaft 89 extends through central opening 77 and projects into socket 38 in collet burr 31 of collet means 30. Rotations of handle 88 of wrench means 85 cause collet burr 31 to rotate relative to rotor means 20 because of the threaded engagement therebetween and to move longitudinally along axis 81. Passage means 53 supplies fluid to bearing means 40 when supply passage 55 is connected to a suitable source of high pressure gas (air). Approximately five percent of the air flowing through passage 55 flows through each of passages 54 and 56 to upper bearing pad 41 and lower bearing pad 42. The fluid flowing through passage 54 flows into annular chamber 49 and then through passages 48 and 51 to provide radial and axial support for rotor element 20. A portion of the gas flowing through passages 48 exhausts through openings 57 in cap 50. A portion of fluid flowing through conduit 56 to lower bearing means 42 exhausts through the clearance between opening 61 in cooling manifold 60 and the dental tool. The remaining fluid from passages 54 and 56 exhausts through an exhaust conduit 59 back through handle 12. Approximately 90 percent of the air flowing through conduit 55 flows through nozzle 58 and impinges upon turbine buckets 23 causing rotor means 20 to be rotated at approximately 500,000 r.p.m. about axis 81. The air exhausts through passage 59. The rotation of rotor means results in additional radial support thereof due to the hydrodynamic bearing effect. Liquid passage 64 and gas passage 65 are supplied with fluid from a suitable source so as to cool the dental tool.

One of the novel features of the applicants' handpiece is the unique design of the cooling manifold 60. Experiments have shown that when manifold 60 has a planar surface only (no annular projection or shoulder 63) operation of the handpiece results in tooth dust being forced through the clearance between opening 61 and the dental tool and into the clearance between rotor means 20 and the bearing pad of lower bearing means 42. This accumulation of tooth dust causes degradation of the performance and reliability of the handpiece. Bearing failure results after only short periods of operation. This problem of accumulation of tooth dust was totally unexpected since there is air exhausting through the clearance between opening 61 and the dental tool from the bearing means. The problem has been completely eliminated by providing shoulder of projection 63 on exterior surface 62 surrounding opening 61. The height of projection 30 is not critical; a projection of .007 is completely satisfactory. Thus, the unique design of cooling manifold 60 greatly increases the performance and reliability of the handpiece, in addition to increasing the cooling effectiveness.

The applicants have provided an improved dental handpiece providing greater concentricity so as to allow precision work to be performed. The applicants' dental handpiece utilizes a cooling manifold design that greatly increases the cooling effectiveness and provides a substantial improvement in performance and reliability of the bearing means.

We claim:

1. In a dental handpiece including a fluid driven rotor rotatably supported within a head and adapted to hold a dental tool therein and means for conducting a fluid to said head, the improvement comprising cooling manifold means integral with said head, said manifold means having a central opening therethrough, which said dental tool may be attached to said rotor; means providing fluid communication between said opening and said means for conducting fluid to said head so that fluid exhausts from said head through said opening, said manifold means having a generally planar exterior surface with an annular projection surrounding said central opening to prevent the fluid exhausting from said opening from attaching to said surface, said manifold means having at least one passage therein adapted to be connected to a source of liquid and at least another passage therein adapted to be connected to a source of gas, and said exterior surface having a plurality of orifices therein in fluid communication with the passages and positioned so as to direct liquid and gas on the dental tool.

2. The invention of claim 1 wherein said annular projection is contiguous to the periphery of said central opening.

3. A dental handpiece comprising:
    a head element, said head element including
        housing means having a bore therethrough;
        fluid driven rotor means, said rotor means having a cylindrical surface on both sides of an enlarged radius section, the enlarged radius section having an annular planar surface on both sides thereof, said rotor means being positioned within said bore of said housing means;
        collet means attached to said rotor means and adapted to hold a dental tool;
        bearing means, said bearing means including a bearing pad positioned within said bore on either side of the enlarged radius section of said rotor means, each bearing pad being resiliently mounted on said housing means for limited rotational and translational movement relative thereto, each bearing pad having a cylindrical aperture therethrough defining a radial supporting surface and a planar surface on one end thereof defining an axial supporting surface;
        passage means adapted to supply fluid to said radial supporting surface and said axial supporting surface whereby the fluid coacts with said radial supporting surface and said cylindrical surface of said rotor means to provide radial support of said rotor means, and the fluid coacts with said axial supporting surface and said annular planar surface of said rotor means to provide axial support of said rotor means;
        nozzle means adapted to direct a fluid to impinge upon said enlarged radius section of said rotor means so as to rotate said rotor means relative to said housing means;

cooling manifold means attached to said housing means at one end of said bore and having a central opening therethrough, said manifold means having a generally planar exterior surface with a shoulder portion circumscribing the central opening, said manifold means having a liquid passage and a gas passage therein, the exterior surface of said manifold having a plurality of orifices therein in fluid communication with said liquid passage and said gas passage;

an end cap attached to said housing at the other end of said bore; and handle means rigidly attached to said head element, said handle means having a conduit means therein for supplying fluid to said passage means and said nozzle means and to said liquid passage and said gas passage of said manifold means.

4. The invention of claim 3 wherein said passage means includes an annular chamber formed intermediate said housing means and each bearing pad and sealed on either end by the resilient mounting means.

5. The invention of claim 4 wherein a plurality of radial bores in each bearing pad are in fluid communication with each annular chamber and said radial supporting surface.

6. The invention of claim 7 wherein a single passage in each bearing pad is in fluid communication with said annular chamber and said axial supporting surface.

References Cited

UNITED STATES PATENTS

| | | | |
|---|---|---|---|
| 3,256,604 | 6/1966 | Borden | 32—28 |
| 3,369,298 | 2/1968 | Werssman et al. | 32—27 |

FOREIGN PATENTS 902,220   8/1962   Great Britain.

ROBERT PESHOCK, *Primary Examiner.*

U.S. Cl. X.R.

235—2